United States Patent
Appeltauer

(10) Patent No.: US 8,992,360 B2
(45) Date of Patent: Mar. 31, 2015

(54) HYBRID DRIVE ARRANGEMENT

(75) Inventor: Peter Appeltauer, Fellbach (DE)

(73) Assignee: Daimler AG, Stuttgart (DE)

( * ) Notice: Subject to any disclaimer, the term of this patent is extended or adjusted under 35 U.S.C. 154(b) by 374 days.

(21) Appl. No.: 13/199,152

(22) Filed: Aug. 20, 2011

(65) Prior Publication Data

US 2012/0035013 A1 Feb. 9, 2012

Related U.S. Application Data

(63) Continuation-in-part of application No. PCT/EP2010/000471, filed on Jan. 27, 2010.

(30) Foreign Application Priority Data

Feb. 21, 2009 (DE) .......................... 10 2009 010 065

(51) Int. Cl.
*F16H 37/06* (2006.01)
*B60K 6/40* (2007.10)
*B60K 6/365* (2007.10)
*B60K 6/48* (2007.10)
*B60K 6/543* (2007.10)
*B60W 20/00* (2006.01)
*F16H 3/72* (2006.01)
*F16H 3/093* (2006.01)

(52) U.S. Cl.
CPC . *B60K 6/40* (2013.01); *B60K 6/365* (2013.01); *B60K 6/48* (2013.01); *B60K 6/543* (2013.01); *B60K 2006/4808* (2013.01); *B60W 20/00* (2013.01); *F16H 3/724* (2013.01); *F16H 2003/0931* (2013.01); *Y02T 10/6221* (2013.01); *Y02T 10/626* (2013.01)
USPC .............................................. 475/5; 475/218

(58) Field of Classification Search
USPC ..................... 475/5, 302, 218, 207, 329, 330; 903/909, 910, 917
See application file for complete search history.

(56) References Cited

U.S. PATENT DOCUMENTS

| | | | |
|---|---|---|---|
| 6,634,986 B2 | 10/2003 | Kima | |
| 2003/0013569 A1* | 1/2003 | Doepke | ............................. 475/5 |
| 2005/0107204 A1 | 5/2005 | Van Druten et al. | |
| 2007/0060432 A1* | 3/2007 | Van Druten et al. | .............. 475/5 |
| 2008/0103002 A1* | 5/2008 | Holmes | .............................. 475/5 |
| 2010/0173746 A1 | 7/2010 | Ideshio et al. | |

FOREIGN PATENT DOCUMENTS

| | | |
|---|---|---|
| CN | 2006 800307507 | 8/2008 |
| DE | 198 49 156 | 9/1999 |
| DE | 101 60 884 | 6/2003 |
| DE | 10 2006 059 591 | 6/2008 |
| EP | 0 845 618 | 6/1998 |

(Continued)

*Primary Examiner* — Justin Holmes
*Assistant Examiner* — Stacey Fluhart
(74) *Attorney, Agent, or Firm* — Klaus J. Bach

(57) ABSTRACT

In a hybrid drive arrangement having a power output, a primary drive machine with a primary drive shaft connecting the primary drive machine to a gear change set for establishing a form-fit connection between the primary drive machine and the power output, a secondary drive machine with a secondary drive shaft for permanently connecting the secondary drive machine to a planetary gear set which is coupled to the primary drive shaft and the secondary drive shaft, the planetary gear set is disposed in parallel to the gear change set in the power flow in at least one operating mode.

4 Claims, 1 Drawing Sheet

(56) References Cited

FOREIGN PATENT DOCUMENTS

| EP | 1 900 564 | 3/2008 |
|----|-----------|--------|
| JP | 2002 165304 | 6/2002 |
| JP | 200216304 | 6/2002 |
| JP | 2005 511976 | 4/2005 |
| WO | WO 03/047898 | 6/2003 |
| WO | WO 2008/156197 | 12/2008 |

* cited by examiner

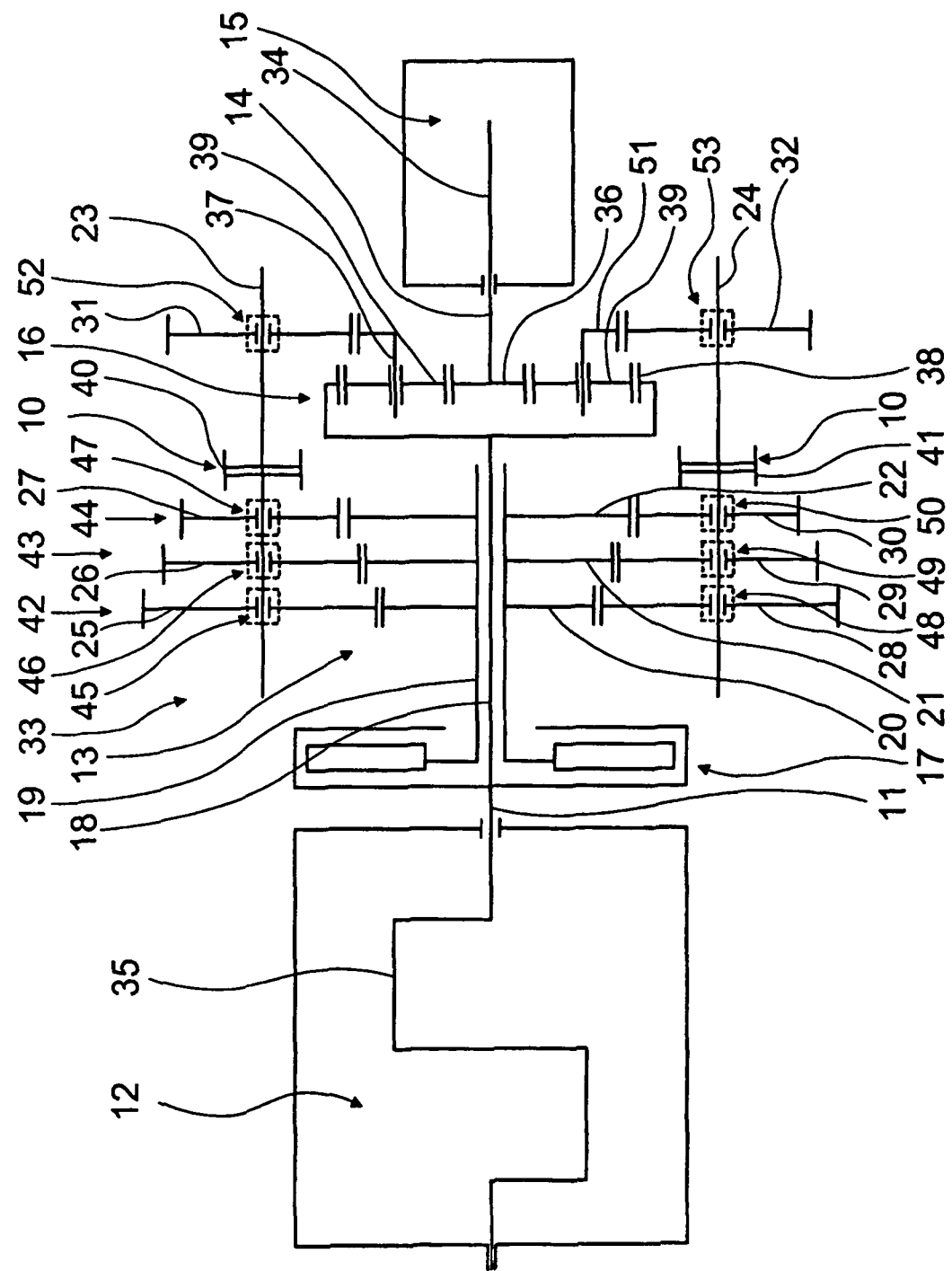

HYBRID DRIVE ARRANGEMENT

This is a Continuation-In-Part application of pending international patent application PCT/EP2010/000471 filed Jan. 27, 2010 and claiming priority of German patent application 10 2009 010 065.2 filed Feb. 21, 2009.

BACKGROUND OF THE INVENTION

The invention relates to a hybrid drive arrangement with a primary drive machine and a secondary drive machine which are coupled via a parallel arrangement of a gear shift transission and a planetary transmission.

Hybrid drive devices with a power output means, including a primary drive means for the permanent connection of a primary drive machine to a gear change transmission for producing a form-fit connection between the primary drive means and the power output means, and a secondary drive means for the permanent connection of a secondary drive machine and with a planetary gear set, which is permanently coupled to the primary drive machine and the secondary drive machine are already known.

It is the principal object of invention to provide a hybrid drive module with a particularly advantageous power flow distribution.

SUMMARY OF THE INVENTION

In a hybrid drive arrangement having a power output means, a primary drive machine with a primary drive shaft connecting the primary drive machine to a gear change set for establishing a form-fit connection between the primary drive means and the power output means, a secondary drive machine with a secondary drive shaft for permanently connecting the secondary drive machine to a planetary gear set which is coupled to the primary drive shaft and the secondary drive shaft, the planetary gear set is disposed in parallel to the gear change set in the power flow in at least one operating mode.

The arrangement provides for a power flow in the hybrid drive device which can be split, whereby a particularly advantageous power flow distribution can be obtained within the hybrid drive device. "In a power flow in parallel" shall thereby mean in particular that a power flow controlled by the gear change set can be transferred at least partially via the planetary gear set. The size of the power flow extending via the planetary gear set can preferably be controlled.

A "power output means" shall further be particularly meant to be a means which is provided for the connection to an axle drive, as for example a gear for the connection to the differential drive. A "primary drive means" shall particularly be meant to be a means for the torque-proof connection to a torque-discharging and/or torque-receiving component of the primary drive machine, as for example a flange and/or a shaft for the permanent torque-proof connection to a crankshaft of an internal combustion engine. A "secondary drive means" shall particularly be meant to be a means for the torque-proof connection to a torque-discharging and/or torque-receiving component of the secondary drive machine, as for example a flange and/or a shaft for the permanent torque-proof connection to a rotor shaft of an electric motor.

It is further suggested that the planetary gear set is provided to adjust a power output means speed and/or a power output means torque. The gear change set can thereby be shifted in a load-free manner in at least one operating mode by means of the planetary gear set, whereby particularly a shift behavior of the hybrid drive device can be adapted in an advantageous manner to a customer requirement. A "power output means speed" is thereby particularly meant to be a value of a speed of the power output means. A "power output means torque" shall particularly be meant to be a torque transferred by the power output means.

In a particularly advantageous arrangement, the planetary gear set is provided in at least one operating mode to synchronize the gear change set. An elaborate synchronizing unit of the gear change set, for example by means of frictionally engaged synchronized shift means can thereby be foregone, whereby a particularly simple arrangement of the gear change set can be achieved, A "gear change set" shall particularly mean an arrangement of at least two gear pairings, which can optionally be shifted for establishing different transmission ratios, wherein a "gear pairing" particularly shall mean an arrangement of at least two gears cogging with each other. A "synchronizing of the gear change set" shall particularly mean a speed adaptation for producing a torque-proof connection in the gear change set. A "shift means" shall particularly mean a shiftable means for producing a form-fit, torque-proof connection. Preferably, at least one shift means of the gear change set is synchronized by means of the planetary gear set in the at least one operating mode.

It is further suggested that the planetary gear set in at least one operating mode is provided to completely transfer a power flow provided for the power output means. A transfer of the power flow can thereby be adapted to the operating mode in an advantageous manner. The at least one operating mode is preferably formed as a shift mode for shifting the gear change set. Thereby, a power output means unequal zero can be adjusted during the shifting of the gear change set, whereby the hybrid drive device can be shifted in a load interruption-free manner. Additionally, a kinetic energy stored in the primary drive machine and in the hybrid drive device can thereby be fed to the power output means in a shift process and thus be transferred into effectively available drive power. Particularly the kinetic energy stored in the primary drive machine, which can have a high amount due to a high centrifugal mass of the primary drive machine, can thereby advantageously be used again in a recuperative manner. A "transfer of a power output torque" is particularly meant to be a transfer of a power flow, by means of which at least a part of a torque at the power output means is provided.

In an advantageous arrangement, the gear change set is arranged at least partially spatially between the primary drive means and the secondary drive means. A compact arrangement with an advantageous achievability of individual components can thereby be realized. The gear change set is preferably arranged completely between the primary drive means and the secondary drive means.

It is further suggested that the hybrid drive device has a load shift clutch unit, which is operatively arranged between the primary drive means and the gear change set. The gear change set can thereby advantageously be decoupled at least partially from the primary drive means in at least one operating mode, whereby a shift behavior of the gear change set can be improved and a customer comfort can thus be increased. As the load shift clutch unit, which can have a high centrifugal mass, can be coupled to the power output means via the primary drive means and the planetary gear set, a kinetic energy stored in the load shift clutch unit can additionally advantageously be used in a recuperative manner or be converted to an effectively usable drive torque when reducing a speed of the load shift clutch unit. A "load shift clutch unit" shall thereby be meant to be a clutch unit for producing a torque-proof connection, which is provided to be shifted under load from one shift state to another shift state, as for example a friction disk clutch. In principle, arbitrary coupling units can be conceived which are arranged in an operative manner between the primary drive means and the gear change set.

In a further arrangement it is suggested that the hybrid drive device comprises at least two drive shafts that can be decoupled from each other, one of which being provided for connection to the planetary gear set and the other for connection to the gear change set. A particularly advantageous arrangement of the gear change set of the other connection of the gear change set can thereby be achieved. The load shift clutch unit is advantageously arranged between the two drive shafts in an operative manner, whereby a particularly arrangement can be achieved.

In a particularly advantageous arrangement, one of the drive shafts is a hollow shaft, through which the other drive shaft extends. A compact arrangement and an advantageous connection of the planetary gear set and of the gear change set can be achieved thereby.

It is further suggested that the gear change set has at least two gears, which are arranged on one of the drive shafts. A gear change set with a high shiftability can be achieved thereby in a simple manner.

The gears of the gear change set arranged on the drive shaft are preferably designed as fixed gears. A particularly advantageous arrangement of the gear change set can be realized thereby.

It is further suggested that the drive shaft in the form of a hollow shaft is provided for the gear change set. An advantageous arrangement of the primary drive means and of the secondary drive means can thereby be realized at opposite sides of the hybrid drive device. In principle it is however also possible to provide the drive shaft in the form of a hollow shaft for the planetary gear set, for example to arrange the primary drive unit and the secondary drive unit on one side of the hybrid drive device.

In a further development of the invention it is suggested that the hybrid drive device comprises at least one power output shaft and at least two gears provided for the gear change set, which are arranged on the at least one power output shaft. A compact forming of the gear change set can be arranged thereby, by means of which the primary drive means can be connected to the power output means in a form-fit manner.

The gears arranged on the at least one power output shaft are preferably formed at least partially as idler gears, which are provided to be connected to the at least one power output shaft in a torque-proof manner. A shiftability of the gear change set can thereby be achieved in a simple manner.

It is further suggested that the hybrid drive device has at least one gear arranged on the power output shaft, which is provided for a form-fit connection of the planetary gear set. An advantageous connection of the planetary gear set can take place thereby. At least one power output shaft can thereby particularly be provided, which can be driven by means of the planetary gear set and by means of the gear change set.

In a particularly advantageous arrangement, the hybrid drive device has at least two power output shafts designed analogously at least partially, which can be driven by means of the gear change set and by means of the planetary gear set. A number of shiftable transmission gears with a low number of gears can be increased on the drive shaft, whereby an axially particularly compact arrangement with a high number of transmission gears can be realized. "Designed analogously at least partially" shall thereby mean that the power output shafts are designed in the same manner with regard to at least one function and/or with regard to at least one arrangement.

The invention will become more readily apparent from a particular embodiment thereof with reference to the accompanying following description of the drawings.

BRIEF DESCRIPTION OF THE DRAWINGS

FIG. 1 shows a part of a motor vehicle drive strand.

DESCRIPTION OF PARTICULAR EMBODIMENTS

The motor vehicle drive strand as shown in FIG. 1 has a primary drive machine 12, a secondary drive machine 15 and a hybrid drive arrangement 33. An axle drive of the motor vehicle drive strand connected to the hybrid drive arrangement 33 is not shown in detail. The primary drive machine 12 is formed by means of an internal combustion engine. The secondary drive machine 15 is formed by means of an electric motor. The hybrid drive arrangement 33 additionally has a control unit, by means of which the active components of the hybrid drive device 33 can be controlled.

The primary drive machine 12 is particularly provided for generating a torque. A primary torque larger than zero for the primary drive machine 12 can be predefined by means of the control unit. The primary drive machine 12 is also provided for a torque accommodation that is, for a primary torque smaller than zero, due to an internal retarding torque.

The secondary drive machine 15 is connected to a power electronics system, not shown in detail, by means of which the secondary drive machine 15 is connected to an energy store, not shown in detail. The secondary drive machine 15 is provided for an active torque accommodation and for an active torque release by means of the power electronics. The secondary torque can be adjusted in a stepless manner between a lower limit value smaller than zero and an upper limit value larger than zero.

Other primary drive machines 12 and/or other secondary drive machines 15 are also conceivable in principle. The secondary drive machine 15 can for example be formed alternatively by means of a hydraulic, hydropneumatic, pneumatic and/or mechanic energy store.

The hybrid drive arrangement 33 has a primary drive shaft 11 for permanently connecting to the primary drive machine 12, a secondary drive shaft 14 permanently connected to the secondary drive machine 15 and a power output means 10 for connection to the axle drive. The primary drive shaft 11 is connected in a torque-proof manner to a crankshaft 35 of the primary drive machine 12 which is an internal combustion engine. The secondary drive means 14 is connected in a torque-proof manner to a rotor shaft 34 of the secondary drive machine 15. The power output means 10 is permanently connected to the axle drive, which is not shown in detail.

The power output means 10 of the shown motor vehicle drive strand is provided for a transverse fitting of the drive arrangement 33 into a motor vehicle. The hybrid drive arrangement 33 can in principle also be provided for a longitudinal fitting. A combination with an all wheel drive module is also conceivable, which is provided for driving more than one drive axle.

The hybrid drive arrangement 33 further has a gear change set 13, by means of which a connection can be provided between the primary drive means 11 and the power output means 10. The gear change set 13 has at least two gear pairs, by means of which different transmission ratios can be provided. The different transmission ratios of the gear pairs are provided for establishing different transmission ratios, which are shifted by a change of gear pairs. By means of the gear change set 13, six transmission gears can be shifted in the shown embodiment, which respectively have different transmission ratios.

The hybrid drive device 33 further has a planetary gear set 16, which is permanently connected to the primary drive shaft 11 and the secondary drive means 14. The planetary gear set 16 has a sun gear 36, a planetary gear carrier 37 and a hollow gear 38. The planetary gear set 16 further has at least one planetary gear 39, which is guided on a circular path and which cogs with the sun gear 36 and the hollow gear 38. The hollow gear 38 of the planetary gear set 16 is connected to the primary drive shaft 11 in a torque-proof manner. The sun gear 36 of the planetary gear set 16 is connected to the secondary drive means 14 in a torque-proof manner. The planetary gear carrier 37 of the planetary gear set 16 is provided for connection to the power output means 10. The planetary gear set 16 is then coupled to the power output means 10 in a form-fit manner.

The planetary gear set 16 connects the primary drive means 11, the secondary drive shaft 14 and the power output means 10 in an operative manner in at least one operating mode. The planetary gear set 16 is arranged in a power flow parallel to a power flow through the gear change set 13 in such an operating mode. A power output means speed and a power output means torque of the power output means 10 are adjusted in at least one operating mode by means of the planetary gear set 16.

The planetary gear set 16 and the gear change set 13 are provided for a power branch-off. The planetary gear set 16 and the gear change set 13 provide two different power flows between the primary drive shaft 11, the secondary drive shaft 14 and the power output means 10. Particularly the primary torque introduced at the primary drive shaft 11 is split in the gear change set 13 and the planetary gear set 16 in an adjustable manner in at least one operating mode. An adjustment of the power branch-off takes place by means of the secondary drive shaft 14.

The primary drive shaft 11 and the secondary drive shaft 14 are arranged coaxially to each other. The primary drive shaft 11 is arranged on a first side of the hybrid drive device 33 along an axial main extension direction of the hybrid drive means 33. The secondary drive shaft 14 is arranged along the main extension direction on a second side of the hybrid drive device 33 opposite the primary drive shaft 11. The hybrid drive device is arranged spatially at least largely between the primary drive machine 12 and the secondary drive machine 15.

For connecting the gear change set 13, the hybrid drive device 33 has a load shift clutch unit 17, which is arranged in a power flow between the primary drive shaft 11 and the gear change set 13. For connecting the gear change set 13, the hybrid drive device 33 has a drive shaft 19, which connects to the load shift clutch unit 17. The load shift clutch unit 17 has two coupling elements, one of which being connected to the primary drive means 11b in a torque-proof manner, and the other one being connected to the drive shaft 19 in a torque-proof manner. The clutch element connected to the primary drive shaft 11 is designed as a clutch cage, which is provided for a frictional connection to the second clutch element in the form of a friction disk.

For connecting the planetary gear set 16, the hybrid drive unit 33 has a further drive shaft 18, which passes through the load shift clutch unit 17 and the gear change set 13. The drive shaft 18 is connected to the primary drive shaft 11 in a torque proof manner. It connects the primary drive shaft 11 with the hollow gear 38 of the planetary gear set 16 in a torque-proof manner. The drive shaft 19 for connecting the gear change set 13 to the primary drive shaft 18 is in the form of a hollow shaft, through which the drive shaft 18 for connecting the planetary gear set 16 extends. The two drive shafts 18, 19 are arranged coaxially to each other. The two drive shafts 18, 19 can be decoupled from each other by means of the load shift clutch unit 17.

For connecting the output means 10, the hybrid drive device 33 has two output shafts 23, 24, which are arranged with respect to the drive shafts 18, 19 in a parallel offset manner. The power output means 10 has two gears 40, 41 which are arranged on respectively one of the output shafts 23, 24. Both gears 40, 41 of the output means 10 are fixed gears. The gears 40, 41 respectively cog with an end power output gear, not shown in detail, which is also a spur gear. The power output means 10 connects the two power output shafts 23, 24 in a form-fit manner, whereby a speed ratio between the two power output shafts 23, 24 is always defined. In the shown embodiment, the two gears 40, 41 have the same tooth number, which is why the two power output shafts 23, 24 always have the same power output speed. In principle, it is however also conceivable to design the gears 40, 41 with different tooth numbers.

The gear change set 13 has three gear planes 42, 43, 44 in the shown embodiment. Three gears 25, 28, 21, 26, 29, 27, 30 are arranged in each of the gear planes 42, 43, 44. The gears 20, 21, 22 arranged on the drive shaft 19 are primary gears. They respectively cog with two of the further gears 25, 26, 27, 28, 29, 30, which are arranged as secondary gears. The gears 25, 26, 27, 28, 29, 30 arranged as secondary gears are arranged on the power output shafts 23, 24. The power output shafts 23, 24 are arranged at different distances to the drive shaft 19 provided for the gear change set 13. The two power output shafts 23, 24 can be connected to the drive shaft 19 in a form-fit manner by means of the gear set change 13.

Six gear pairings are realized by means of the nine gears 20, 21, 22, 25, 26, 27, 28, 29, 30. The gears 20, 21, 22 arranged on the drive shaft 19 are thereby respectively provided for two of the gear pairings. Due to the different distances of the power output shafts 23, 24 with regard to the drive shaft 19, all gear pairings have different transmission ratios. Six different transmission ratios are thus realized by means of the gear change set 13.

The gears 25, 26, 27, 28, 29, 30 arranged on the power output shafts 23, 24 are in the form of idler gears. For connecting the gears 25, 26, 27, 28, 29, 30 to the power output shafts 23, 24, the gear change set 13 has six shift means 45, 46, 47, 48, 49, 50, which can preferably be shifted independently of each other. The shift means 45, 46, 47, 48, 49, 50 are designed in an unsynchronized manner. The shift means 45, 46, 47, 48, 49, 50 respectively have a shift position and a neutral position. In the shift position, the shift means 45, 46, 47, 48, 49, 50 connect the associated gear 25, 26, 27, 28, 29, 30 to the respective power output shaft 23, 24. In the neutral positions, the corresponding gears 25, 26, 27, 28, 29, 30 are decoupled from the associated power output shaft 23, 24. No synchronizing means are arranged between the power output shaft 23, 24 and the corresponding gear 25, 26, 27, 28, 29, 30, which means are normally provided for producing a friction-fit connection during a shift process. The shift means 45, 46, 47, 48, 49, 50 are designed as dog shift clutches that can be shifted by means of a sliding collar. The shift means 45, 46, 47, 48, 49, 50 can in principle also be provided in one piece for several of the gears 25, 26, 27, 28, 29, 30, as for example an arrangement as sliding engagement collars that can be shifted to both sides.

For connecting the planetary gear set 16, the hybrid drive device 33 has two further gears 31, 32, which are respectively arranged on the power output shafts 23, 24 and which cog with a gear 51, which is connected to the planetary gear carrier 37 of the planetary gear set 16 in a torque-proof manner. The two gears 31, 32 are idler gears. They can be connected independently of each other to the respective power output shaft 23, 24. Shift means 52, 53 for shifting the gears 31, 32 as are unsynchronized dog clutches corresponding to the shift means 45, 46, 47, 48, 49, 50 of the gear change set 13.

Due to the different distances of the power output shafts 23, 24 with regard to the drive shaft 19, the two gears 31, 32 for coupling the planetary gear set 16 have different radii. By means of the two gears 31, 32, different transmission ratios are formed for the coupling of the planetary gear set 16 to the two power output shafts 23, 24. By coupling the power output shafts 23, 24 by way of the power output means, one of the gears 31, 32 can in principle also be omitted. The remaining gear of the gears 31, 32 can then be in the form of a fixed gear. In principle, a second power output shaft is not necessary in connection with the arrangement according to the invention.

The control unit, by means of which different operating modes can be shifted for the hybrid drive unit 33, is provided for the control of the shift means 45, 46, 47, 48, 49, 50, 52, 53 and the load shift clutch unit 17, which can respectively be shifted by means of active actuation means. The control device is further provided to determine the primary torque and the primary drive speed of the primary drive machine 12 and the secondary torque and of the secondary drive speed of the secondary drive machine 15.

In all operating modes described in the following, one of the two shift means 52, 53 for connecting the planetary gear set 16 is closed. The planetary gear set 16 is permanently connected to the power output shafts means in the operating mode. A shift mode, in which a shift position of the shift means 52, 53 is changed, is not described in detail, but it can be designed analogously to a shift mode for shifting the gear change set 13 described in the following.

For starting the primary drive machine 12 which is an internal combustion engine 12, the hybrid drive device 33 has a start-up mode. In the start-up mode, the control unit shifts the gear change set 13 into a neutral position. In the neutral position of the gear change set 13, the power output shafts 23, 24 are only connected to the primary drive shaft 11 via the planetary gear set 16. For the start-up mode, the control unit further activates, for example, a parking lock, not shown in detail, by means of which the power output means 10 is locked to a transmission housing, not shown in detail. The parking lock can for example be realized by means of a vehicle brake. A secondary torque controlled by means of the control unit is subsequently applied to the primary drive shaft 11 since the power output shafts are locked, whereby the primary drive machine can be started by means of the secondary torque supplied by the secondary drive machine 15. The hybrid drive device 33 further has a starting mode, which is provided for starting a vehicle from a standstill. In the starting mode, the primary speed is unequal zero. The control unit sets a secondary speed corresponding to the primary speed, due to which a power output speed is adjusted to zero. For shifting the gear change set 13, the control unit opens the load shift clutch unit 17 and shifts the gear change set 13 into a desired transmission gear. As soon as the transmission gear is engaged, the control unit successively closes the load shift clutch unit 17, whereby the primary torque introduced at the primary drive shaft is transmitted to the power output means 10 via the gear change set 13. Additionally, in the starting mode, the control unit can set a secondary torque larger than zero, which, in the starting mode, is also transmitted to the power output means 10 by way of the planetary gear set 16.

The hybrid drive unit 33 further has a drive mode, in which the gear change set 13 is shifted in a defined gear and the load shift clutch unit 17 is closed. In the drive operating mode, the primary drive shaft 11 is always connected to the power output means 10 in a form-fit manner. The secondary drive shaft 14 is permanently connected to the primary drive shaft 11 and permanently to the power output means 10 via the planetary gear set 16. In the drive mode, the gear change set 13 and the planetary gear set 16 are arranged in parallel in the power flow. For the drive mode, the hybrid drive device 33 is provided for a boost mode for providing an additional torque energy and an energy storage mode for converting kinetic energy and storing it as electric energy.

In the boost mode, the control unit provides for a secondary torque larger than zero, which is transferred to the power output means 10 by way of the planetary gear set 16 in addition to the primary torque already generated. The power output means torque is formed in dependence on a sum of the primary torque and the secondary torque. The additional kinetic energy is introduced into the hybrid drive device 33 via the additional secondary torque.

In the energy storage mode, the control unit gives a secondary torque smaller than zero. A torque introduced into the hybrid drive device 33 is thereby discharged via the secondary drive shaft 14, whereby kinetic energy can be withdrawn from the hybrid drive device 33 and be stored. The torque introduced into the hybrid drive device 33 can basically be provided by way of the primary drive means 11 and/or by way of the power output means 10. If the torque is introduced via the power output means 10, the energy storage mode is in the form of a power recuperation mode. If the torque is additionally and/or alternatively introduced via the primary drive shaft 11, the energy storage mode is additionally and/or alternatively in the form of a load mode. In the load mode, a part of the torque introduced via the primary drive shaft 11 can be directed to the power output means 10, whereby a drive and energy storage can be achieved simultaneously.

The hybrid drive device 33 is further provided for an upshift mode for the load interruption-free shifting of the gear change set 13. The control unit shifts the gear change set 13 in the upshift mode with a defined shift speed under load from one transmission gear to a higher transmission gear. For shifting the gear change set 13, the control unit adjusts to a power branch-off in a first phase of the upshift mode, where the power flow provided for the power output shaft 10 extends completely over the planetary gear set 16. In a second phase of the upshift operating mode, the control unit adapts the primary speed to a speed adapted to a higher transmission gear. In a third phase, the control unit shifts into the high transmission gear.

In the first phase, the control unit opens the load shift clutch unit 17 with a gradient deposited in the control unit. An opening of the load clutch unit 17 starts shortly before the primary speed reaches the shift speed. Parallel to this, the control unit adjusts a secondary torque larger than zero, whereby the primary torque introduced by the primary drive means 11 is transmitted increasingly over the planetary gear set 16. As soon as the power flow transmitted via the gear change set 13 is sufficiently small, the control unit reduces the primary torque and shifts the gear change set 13 into the neutral position, by reducing the primary torque, until the previously shifted shift means of the shift means 45, 46, 47, 48, 49, 50 can be shifted into the neutral position at least largely in a load-free manner. The power flow provided for the power output means 10 is thereby completely transmitted via the planetary gear set 16.

In the second phase, the load shift clutch unit 17 remains partially closed. The control unit sets a secondary torque, where the primary speed drops. By means of the drop of the primary speed, a kinetic energy stored in the primary drive machine 12 and in the hybrid drive device 33, particularly in the load shift clutch unit, is partially supplied to the power output output 10. As the secondary torque given by the control unit is higher than zero, the power output means is also larger than zero. During the second phase, the control unit adjusts the primary speed by means of the primary torque and the secondary torque to a speed adapted to the higher transmission gear.

In the third phase, in which the primary speed has the speed adapted to the higher transmission gear, the shift means 45, 46, 47, 48, 49, 50 assigned to the high transmission gear can be shifted into its shift position in a load-free manner. Thereby, the primary drive shaft 11 is again connected to the power output means 10 in a form-fit manner by means of the gear change set 13, whereby the shifting of the gear change set 13 is concluded. The load shift clutch unit 17 can be operated partially in a slipping manner during the third phase. The load shift clutch unit 17 is closed completely for concluding the up shift mode.

The hybrid drive device 33 is further provided for a load interruption-free downshift mode. In the downshift mode, the control unit shifts the gear change set 13 at a defined shift speed under load from one transmission gear to a lower transmission gear. In a first phase of the downshift mode, the control unit adjusts to a power branch-off, where the power flow extends completely via the planetary gear set 16. In a second phase of the downshift mode, the control unit adapts the primary speed to a speed adapted to the lower transmission gear. In a third phase, the control unit shifts into the lower transmission gear. The downshift mode takes place in principle analogously to the down shift mode. All transmission gears shiftable by means of the gear change set can be load-shifted amongst each other independently of an arrangement of the gear pairings of the gear change set 13 in the upshift mode and the downshift mode.

What is claimed is:

1. A hybrid drive arrangement including a primary drive machine (12) with a primary drive shaft (11), a secondary drive machine (15) with a secondary drive shaft (14) extending co-axially with the primary drive shaft (11), a planetary gear set (16) permanently coupled to the secondary drive shaft (14), an intermediate drive shaft (18) connected to the primary drive shaft and also to the planetary gear set (16), a load shift clutch unit (17) mounted on the primary drive shaft (11) and having coupling elements, one of the coupling elements being connected to the primary drive shaft (11) for rotation therewith and another of the coupling elements being connected to a hollow shaft (19) through which the intermediate drive shaft (19) extends, a gear change set (13) arranged between the clutch unit (17) and the planetary gear set (16) and including a plurality of drive gears (20, 21, 22) mounted on the hollow shaft (19) for rotation therewith, a first output shaft (23) extending parallel to the hollow shaft (19) at a predetermined distance therefrom with first output gears (25, 26, 27) in engagement with the drive gears (20, 21, 22) and being rotatably supported on the first output shaft (23) but being connectable thereto by first gear shift means (45, 46, 47), a second output shaft (24) extending parallel to the hollow shaft (19) at a distance therefrom different from that of the first output shaft (23) and carrying second output gears (28, 29, 30) in engagement with the same drive gears (20, 21, 22) with which the first output gears (25, 26, 27) are engaged and each having second gear shift means (48, 49, 50) for connection to the second output (24), the planetary gear set (16) having a planetary gear carrier (37) provided with a carrier gear (51) in engagement with a first transfer gear (31) rotatably supported on the first output shaft (23) and connectable thereto by a third gear shift means (52) and also in engagement with a second transfer gear (32) rotatably supported on the second output shaft (24) and connectable thereto by a fourth gear shift means (53) for connecting the secondary drive machine (15) selectively to the first and the second output shafts (23, 24).

2. The hybrid drive device according to claim 1, wherein the planetary gear set (16) is provided for adjusting, in combination with the secondary drive machine (15), a power output shaft speed and/or a power output shaft torque.

3. The hybrid drive device according to claim 2, wherein the planetary gear set (16) is provided to synchronize the gear change set (13) in at least one operating mode.

4. The hybrid drive device according to claim 1, wherein the planetary gear set (16) is provided to completely transfer a power flow provided for the first output shaft (23) in at least one operating mode.

* * * * *